UNITED STATES PATENT OFFICE.

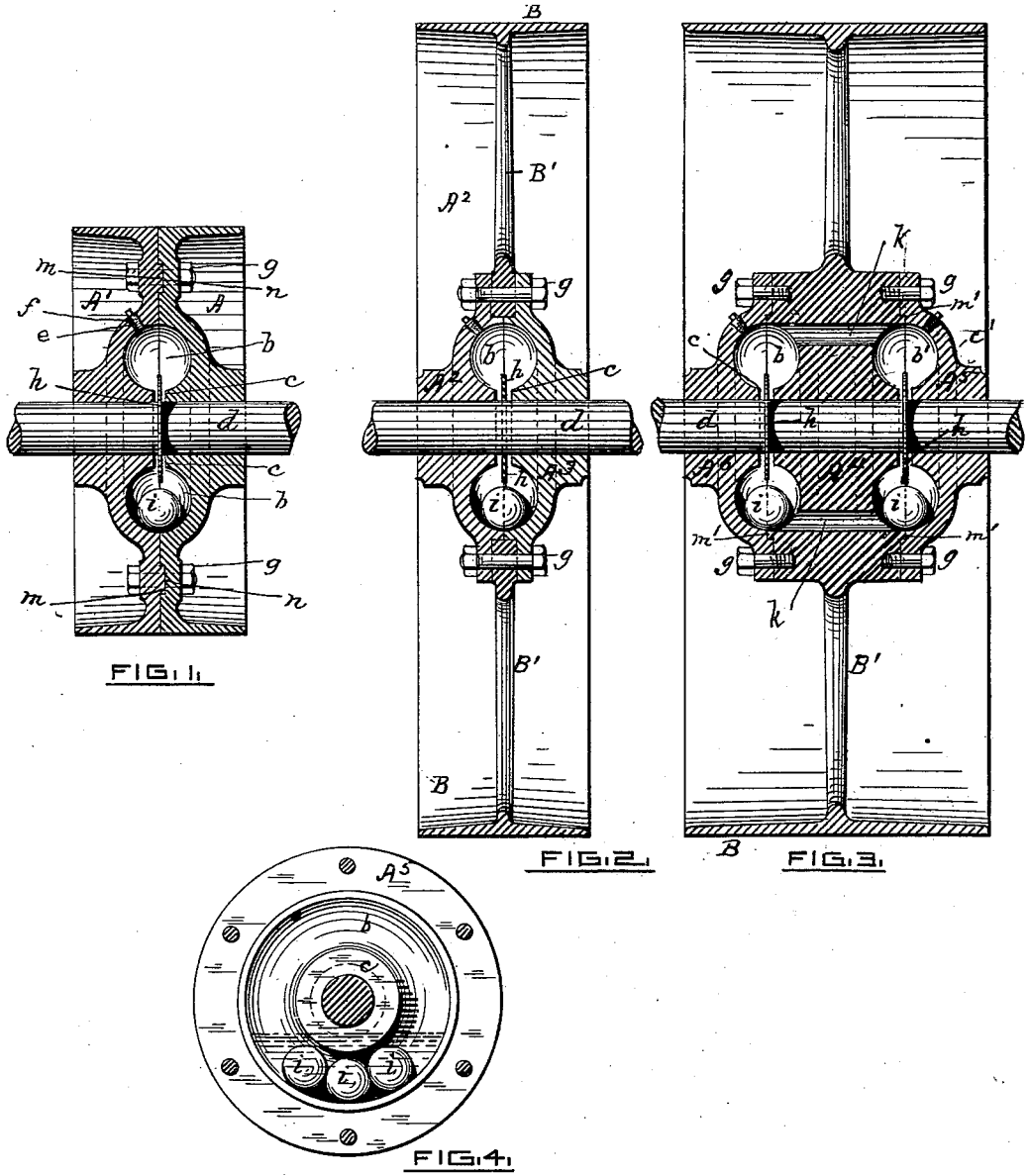

EDWARD J. F. COLEMAN, OF PROVIDENCE, RHODE ISLAND.

PULLEY.

SPECIFICATION forming part of Letters Patent No. 259,370, dated June 13, 1882.

Application filed May 9 1882. (No model.)

*To all whom it may concern:*

Be it known that I, EDWARD J. F. COLEMAN, of Providence, Rhode Island, have invented certain new and useful Improvements in Pulleys, of which the following is a specification.

My invention relates to loose pulleys, or pulleys which revolve upon the axles or shafts on which they are mounted, and it has particular reference to the lubrication of such pulleys.

I adopt for my pulley a plan of construction analogous to that set forth in my Letters Patent No. 240,812, dated May 3, 1881, save that in pulleys of large diameter, where spokes are required, the rim is made in one piece, and the pulley-hub only is made in sections, these sections, like those described in my patent, being recessed on their contiguous faces, so as to form, when put together, a lubricant chamber and passage leading therefrom to the shaft or axle on which they revolve, and being provided also on contiguous faces with interlocking portions to prevent slip motion.

The lubricating material which I find best fitted for use is a viscous compound composed of beeswax and petroleum. This lubricant will not, as a body, become thin unless subjected to powerful heat, nor, on the other hand, will it unduly harden when subjected to cold. The pulley devised by me has been made with special reference to the use therewith of this lubricant.

I find it requisite, in order to obtain proper distribution of the lubricant, to employ some means for agitating the lubricant in the lubricating-chamber and of conveying it to the shaft or axle. The agitators I prefer are small balls of metal or glass, preferably of the latter material, which are placed loose in the annular lubricating-chamber of the pulley. The conveyer which I prefer to employ is a thin copper ring or annular disk encircling the shaft or axle, and situated in the passage leading from the annular lubricating-chamber to the axle or shaft. This ring or disk is very susceptible to heat, and during the revolution of the shaft or pulley, or both, becomes heated. In this condition it (when the movement of the parts becomes slow or ceases) will take up and convey to the axle the requisite amount of lubricating material. When the pulley is moving at full speed lubrication does not take place, owing to centrifugal action; but at the times when the pulley is stopping or starting the agitators and conveyer do their work and convey a sufficient quantity of grease to the bearing to last for eight or ten hours, or even longer. I may here remark that when the pulley stops the glass balls or agitators drop to the bottom portion of the annular lubricating-chamber and force a portion of the grease up toward and in contact with the copper conveying disk or ring, so that even if the chamber be nearly empty the balls will nevertheless act to put the lubricant in communication with the conveying-disk.

The nature of my improvements and the manner in which the same are or may be carried into effect will be readily understood by reference to the accompanying drawings, in which—

Figure 1 is a transverse axial section of a pulley of small diameter embodying my improvements. Figs. 2 and 3 are like sections of modified forms of pulleys, hereinafter described. Fig. 4 is an inner face view of one of the heads or outer sections of the hub of the pulley shown in Fig. 3.

The pulley represented in Fig. 1 is composed of two disk-like sections, A A′, of such configuration as to form, when put together, the rim, web, and hub of a pulley. The contiguous faces of the sections are recessed to form an annular lubricating-chamber, $b$, and an annular slot or passage, $c$, extending from this chamber to the bearing-surface of the hub which surrounds the axle or shaft $d$. Lubricating material is supplied to the chamber through a hole, $e$, closed by a plug, $f$. The sections are clamped together by suitable means—as, for instance, by bolts $g$; and in order to prevent slip motion and to break joint the one is provided with a tongue or tenon, $m$, which fits into a mortise or groove, $n$, in the other.

The parts thus far described are organized and arranged for joint operation substantially in the manner shown and described in my aforesaid patent.

The devices for agitating and conveying the viscous lubricating material from the chamber $b$ to the bearings are shown at $h$ $i$. $i$ are balls of comparatively small size, and made preferably of glass, which are placed loose in the chamber $b$. $h$ is a thin copper ring, washer, or annular disk, which encircles but is not fastened to the axle, and extends outwardly through the annular passage $c$ into the chamber $b$. The functions and mode of operation of these parts have been above set forth, and need not be here repeated. By their conjoint action the pulley is kept thoroughly lubricated without waste.

When the diameter of the pulley is increased to an extent where spokes are required between the rim and the hub, it becomes desirable, and in some cases necessary, to modify the construction represented in Fig. 1 to the extent of making the rim and spokes in one, the hub, however, still being made in sections corresponding to those represented in Fig. 1. Such a construction is illustrated in Fig. 2. In this case the rim B and spokes B' are cast in one piece.

The hub is composed of two sections, $A^2 A^3$, corresponding to the hub portion of sections A A' in Fig. 1. These sections $A^2 A^3$ are recessed on their contiguous faces to form the chamber $b$ and passage $c$, and have combined with them the agitators $i$ and conveyer $h$, in the manner already described. The spokes B' are let into recesses in the periphery of the hub, and are held by the same bolts, which clamp together the hub-sections.

If desired, the rim, spokes, and one hub-section can be cast in one piece, and the other section made separately therefrom and applied thereto in the manner indicated in the drawings.

In case a bearing of considerable length—say over six inches long—is required, I provide two annular reservoirs or lubricant-chambers, which may be connected together by channels or passages, so as to permit both chambers to be filled from one feed-opening. A convenient form of pulley of this character is represented in Fig. 3, the same being somewhat like the one shown in Fig. 2, with the exception of the additional chamber or reservoir. In this instance the rim B and spokes B' are cast in one with the central section, $A^4$, of the hub, and this section has its two side faces recessed in such manner that when the two correspondingly-recessed heads or sections, $A^5 A^6$, are applied, one to each of its faces, there will be formed two lubricating chambers or reservoirs, $b\ b'$, and passages $c\ c'$. One of these heads is shown in Fig. 4. They are shouldered into the central section, as indicated at $m'$, and are secured to said section by bolts or screws $g'$. The two chambers $b\ b'$ may be connected by passages K, so that both chambers may be filled by injecting the lubricant through either one of the openings $e$. In each chamber and passage are placed agitators $i$ and a conveyer, $h$, as hereinbefore described.

Having described my improvements, what I claim, and desire to secure by Letters Patent, is—

1. The combination, with the sectional pulley-hub formed with an annular lubricant reservoir or chamber and an annular passage leading therefrom to the hub-bearing, of the agitators loose within the chamber, substantially as and for the purposes hereinbefore set forth.

2. The conveyer disk or ring, in combination with the axle or shaft and the sectional pulley-hub formed with annular lubricant-chamber and annular passage leading therefrom to the shaft, substantially as set forth.

3. The combination, with the axle or shaft and the sectional pulley-hub formed with annular lubricant chamber or reservoir and passage leading therefrom to the shaft, of the agitators loose within the chamber and the conveyer encircling the shaft and extending through the passage into the chamber, substantially as set forth.

4. The hub-sections recessed on their contiguous faces, so as to form, when put together, the chamber $b$ and passage $c$, in combination with the solid rim and spokes connecting the rim to the hub, substantially as hereinbefore set forth.

5. The pulley made substantially as shown and described with reference to Fig. 3, consisting of a central hub-section and two heads or external sections, constructed and put together substantially as specified, so as to form within the sectional hub two chambers, $b$, and passages $c$, in combination with the pulley-rim and spokes connecting the rim to the central section, substantially as set forth.

In testimony whereof I have hereunto set my hand this 5th day of May, 1882.

EDWARD J. F. COLEMAN.

Witnesses:
 CHARLES PAY, 2d,
 CHARLES H. LEONARD.